United States Patent [19]

Boehm

[11] Patent Number: 5,023,099

[45] Date of Patent: Jun. 11, 1991

[54] METHOD FOR PRODUCING SOFT COOKIES HAVING BLOOM RESISTANCE

[75] Inventor: Donald G. Boehm, Mt. Kisko, N.Y.

[73] Assignee: Nabisco Brands, Inc., East Hanover, N.J.

[21] Appl. No.: 348,119

[22] Filed: May 3, 1989

Related U.S. Application Data

[63] Continuation of Ser. No. 96,308, Sep. 9, 1987, abandoned, which is a continuation of Ser. No. 737,687, May 24, 1985, abandoned.

[51] Int. Cl.$^5$ ............................................. A21D 8/00
[52] U.S. Cl. .................................... 426/549; 426/560; 426/601
[58] Field of Search ................. 426/94, 103, 549, 560, 426/601, 653, 654

[56] References Cited

U.S. PATENT DOCUMENTS

| | | | |
|---|---|---|---|
| 3,459,777 | 8/1969 | Seiden | 426/607 |
| 4,344,969 | 8/1982 | Youngquist et al. | 426/18 |
| 4,360,534 | 11/1982 | Brabbs et al. | 426/94 |
| 4,374,863 | 2/1983 | Savage | 426/553 |
| 4,444,799 | 4/1984 | Vanderveer et al. | 426/549 |
| 4,455,333 | 6/1984 | Hong et al. | 426/94 |
| 4,456,625 | 6/1984 | Durst | 426/549 |
| 4,503,080 | 3/1985 | Brabbs et al. | 426/94 |
| 4,511,318 | 4/1985 | Kolodesh et al. | 426/94 |
| 4,511,585 | 4/1985 | Durst | 426/106 |
| 4,514,430 | 4/1985 | Hartman | 426/560 |
| 4,582,711 | 4/1986 | Durst | 426/106 |
| 4,596,714 | 6/1986 | Brabbs | 426/297 |
| 4,624,856 | 11/1986 | Vanderveer | 426/549 |
| 4,664,921 | 5/1987 | Seiden | 426/297 |

FOREIGN PATENT DOCUMENTS

| | | |
|---|---|---|
| 31718 | 7/1981 | European Pat. Off. . |
| 138414 | 4/1985 | European Pat. Off. . |
| 163496 | 12/1985 | European Pat. Off. . |
| 48-04543 | 2/1973 | Japan .................. 426/330.6 |
| 48-04544 | 2/1973 | Japan . |

OTHER PUBLICATIONS

Matz, Cookie and Cracker Technology, 1968, pp. 119-120.

Kleinert, "Studies on the Formation of Fat Bloom and Methods of Delaying It," Rev. Intern. Chocolat, vol. 16, pp. 345-368 (1961).

*Primary Examiner*—Donald E. Czaja
*Assistant Examiner*—Mary S. Mims

[57] ABSTRACT

Bloom resistance in shelf-stable cookies which have a moist, cake-like soft textured crumb structure over an extended period of time is achieved with a shortening or fat for promoting softness and having a solid fat index of less than 13 at 80° F. and which is essentially completely liquid at 100° F. A flavoring ingredient which reduces mobility of the shortening or fat in the cookie is used to prevent seepage of the shortening or fat at cookie storage temperatures.

19 Claims, No Drawings

METHOD FOR PRODUCING SOFT COOKIES HAVING BLOOM RESISTANCE

This application is a continuation of prior U.S. application Ser. No. 096,308, filed Sept. 9, 1987 now abandoned, which is a continuation of application Ser. No. 737,687, filed May 24, 1983, now abandoned.

FIELD OF THE INVENTION

This invention relates to methods for producing bloom resistant cookies having a soft texture throughout the cookie. This invention also relates to cookie dough compositions for producing the cookies.

BACKGROUND OF THE INVENTION

Cookies with a moisture content above about 6% by weight are usually soft and cohesive. To produce cookies which retain enough moisture to be classified as soft, numerous humectants have been used. Exemplary thereof are raisins, raisin pastes, high fructose corn syrup, corn syrup, glycerine, and mixtures thereof. Without the use of such humectants, cookie doughs which contain sufficient water to compensate for volatilization during baking: 1) do not exhibit sufficient cohesiveness for forming into pieces on conventional commercial scale cookie forming equipment, 2) exhibit raw flavor or color qualities, and 3) most importantly, lose their soft texture within a week or within a few days even when properly packaged in air-tight packaging. Generally, increasing the humectant content of the cookie dough extends the textural stability of soft cookies.

Liquid humectants such as high fructose corn syrup, corn syrup, glycerin and molasses are readily dispersed through a dough for providing a homogeneously soft texture to the cookies. However, it has been found that I5 soft cookies which contain chocolate chips tend to exhibit "bloom" on the flavor chips under storage conditions. Bloom appears as a whitish deposit, either in the form of discrete particles or a continuous layer, which covers at least part of the surface of the flavor chip. Bloom may be caused by the formation of fat and/or sugar crystals on the surface of the chips. While bloom may occur on flavor chips other than chocolate chips, it is particularly apparent in dark chips. The whitish deposits are even more apparent in dark cookies, such as chocolate fudge cookies. Although bloom does not pose any health risk, it is aesthetically unappealing and may lead consumers to the conclusion that the whitish deposits are due to mold growth or rancidity, or that the product lacks freshness or richness.

It is believed that migration of water in soft cookies from the crumb portion to the flavor chip surface dissolves sugar in the chip. Recrystallization of the sugar, caused by a drop in temperature, results in the formation of sugar crystals which are visible as "sugar bloom". Sugar crystals or other non-fat solids on the flavor chip surface may also serve as nucleation sites for recrystallization of fat crystals. The fat which recrystallizes may have originated in the flavor chip or the shortening or fat used in forming the dough. It is believed that the fat components having a higher melting point serve as nucleation sites for the other fat components because upon cooling, the higher components reach their solidification temperature first. Additionally, the higher melting point components, particular those which solidify at temperatures above normally encountered cookie storage temperatures, have less time to crystallize. The more rapid crystallization results in an unstable crystal form which cannot transform into a stable form.

In producing soft cookies, the use of a shortening or fat which is completely liquid at normal cookie storage temperatures of less than about 100° F., may result in excessive oven spread and/or oil seepage to the surface of the cookie. Undesireable puddles of liquid fat or greasiness tends to smear packaging material, develop rancidity, and causes annoyance upon handling of the product.

The present invention provides shelf-stable cookies having a moist, cake-like soft textured crumb structure over an extended period of time which exhibit resistance to fat and sugar bloom on flavor chips. Even though a shortening or fat which contains low proportions of solid fats at cookie storage temperatures is used to prevent bloom, the cookies do not exhibit excessive oven spread or seepage of liquid oil at those temperatures.

SUMMARY OF THE INVENTION

The present invention provides shelf-stable cookies having a moist, cake-like soft textured crumb structure over an extended period of time which are fat and sugar bloom resistant. A shortening or fat having a solid fat index of less than 13 at 80° F. (26.7° C.) and which is essentially completely liquid at about 100° F or below, is used to prevent bloom on flavor chips. The shortening or fat is used in amounts which promote a moist, soft texture in the cookie.

A flavoring ingredient which reduces mobility of the shortening or fat in the cookie controls excessive oven spread and prevents undesireable oil seepage from the cookie to packaging materials.

DETAILED DESCRIPTION OF THE INVENTION

In the present invention a shortening or fat having a solid fat index of less than 13 at 80° F. (26.7° C.) and which is essentially completely liquid at about 100° F or below is used to prevent sugar and/or fat bloom on flavor chips in shelf-stable moist, soft cookies. The cookies retain a moist, cake-like soft textured crumb structure for extended periods of time when properly packaged. It is believed that the low melting shortening or fat coats the flavor chip particles during mixing, and baking and post baking cooling. Water, which imparts a moist, soft texture, is repelled from the surface of the flavor chips. This, it is believed, prevents dissolution of sugar in the chips and subsequent recrystallization of the sugar on the chip surface thereby avoiding sugar bloom and nucleation sites for fat crystals. Sugar crystals which may form, or other non-fat components which may serve as nucleation sites, may be washed off the flavor chip particles by the liquid shortening or fat. Furthermore, as the proportion of components which melt at lower temperatures is increased in a shortening or fat, it is less likely that fat crystallization, particularly undesireable fat crystallization, will occur at cookie storage temperatures. Upon cooling of the cookie after baking to normal cookie storage temperatures, the fat components will remain liquid or will have more time to crystallize into a stable form.

The shortening or fat, or oil, can be made from vegetable oils such as soybean oil, sunflower oil, palm oil, safflower oil, corn oil, and blends thereof. A typical shortening or fat for use in the present invention is a blend of soybean oil and palm oil, each 20 of which is refined, bleached, partially hydrogenated, and deodorized, with the soybean oil being from about 45% by weight to about 55% by weight of the mixture. It suitably has a solid fat index of from about 18 to about 31 at 50° F. (10° C.), and a solid fat index of from about 7 to about 11 at 80° F. (26.7° C.). The oils are preferably stabilized with antioxidant, such as tertiarybutylhydroquinone (TBHQ), and contain citric acid as a chelating agent. Partially hydrogenated vegetable oils suitable for use in the present invention are readily available commercially.

The shortening or fat, or oil, is used in an amount which is sufficient to promote a soft textured crumb structure. Typical amounts range from about 20% by weight to about 80% by weight, preferably from about 35% by weight to about 65% by weight, based upon the weight of the flour.

Excessive oven spread due to the presence of liquid humectants, water, and the high levels of liquified shortening or fat, or oil, is controlled by a flavoring ingredient which reduces the mobility of the shortening or fat in the cookie. Reduction in the mobility of the shortening or fat, or oil, prevents seepage of it to the packaging materials. Reduction in mobility may be caused by slurry formation, absorption of the liquid oil, solubilization in the liquid oil so as to increase its viscosity, binding with proteins, or a combination thereof.

Interaction of the flavoring ingredient and the liquid shortening or fat, or oil, is also believed to enhance flavor and a moist mouthfeel upon eating of the cookie. Liquid fat components provide an impression of moistness and serve as a carrier for flavor components, particularly upon a reduction in viscosity as they reach body temperatures.

Exemplary of flavoring ingredients which may be used to inhibit shortening or fat, or oil migration in the soft cookies are cocoa, Dutched cocoa, carob powder, and mixtures thereof. A suitable amount of the flavoring ingredient ranges from about 10% by weight to about 45% by weight of the shortening or fat. The flavoring ingredient is prefereably in powdered form, for greater absorbability, suspendability or solubility. It should be lipophilic so as to inhibit shortening or oil migration preferentially over migration of water in the cookie.

The term "flavor chips" is used herein to denote any particles comprising fat and sugar added to cookies for flavoring purposes which remain as discrete, visually apparent inclusions in the baked cookie, and which may render the cookie susceptible to bloom effects. Thus, the term includes, chocolate chips, butterscotch chips, caramel chips, and mixtures thereof. Chocolate chips generally pose the greater bloom problems because of their dark color. Typical amounts used range from about 35% by weight to about 90% by weight of the flour. Suitable flavor chips have a count per pound of from about 4000 to about 6000.

The humectant used in the cookies should absorb and bind or hold water so as to impart a shelf-stable softness. The binding should be such that the equilibrium rate of moisture loss from the baked product to the environment due to the presence of the humectant is slowed to such a degree that a baked product containing the humectant, and having an initial moisture content of at least about 6% by weight, exclusive of inclusions retains a moist, soft and pliable cake-like texture, for at least about two months, and preferably for at least about 6-12 months when the cookie is stored in a closed container.

Humectant sugars may be employed alone or in combination with other sugars in the cookie dough to impart a soft texture. Suitable humectant sugars include fructose, lactose, dextrose, corn syrups, invert syrups, high fructose corn syrups, honey, molasses, raisin paste, as well as mixtures of one or more of the foregoing humectants. For example, a suitable humectant sugar composition for use in the cookie dough may comprise about 0 to 85 percent sucrose, with the balance of the sugar being comprised of fructose employed in the form of crystallized sugar. Alternatively, the balance of the sugar may be provided by the sugar solids content of a corn syrup, honey or a high fructose corn syrup, or another humectant sugar.

Commercially available high fructose corn syrups are preferred humectants. They are low in cost, are highly humectant, provide a pleasant sweet taste, and are readily commercially available. They are prepared by the enzymatic isomerization of dextrose containing corn syrups, and typically possess a sugar solids component of about 40 percent to about 100 percent by weight fructose, with the balance of the non-fructose sugar solids being primarily dextrose plus minor amounts of other monosaccharides. The sugar solids content of commercially available high fructose corn syrups typically ranges from about 70 percent to about 73 percent, up to about 82 percent by weight. High fructose corn syrups having at least about 80% by weight of their solids as fructose are most preferred. Examples of other humectant sugars include maltose, sorbose, mannose, and galactose. When sucrose is employed in the cookie dough, the humectant sugar should comprise at least about 15 percent, and preferably at least about 20 percent, by weight of the total sugar solids content of the cookie dough.

In addition to the humectant sugars, humectants, or aqueous solutions of humectants which are not sugars or possess a low degree of sweetness relative to sucrose may also be employed in the cookie dough. For example, the use of glycerol, sugar alcohols such as mannitol, maltitol, xylitol and sorbitol, and other polyols, as humectants is well known in the art. Additional examples of humectant polyols (i.e. polyhydric alcohols) include humectant glycols, for example propylene glycol and hydrogenated glucose syrups. Other humectants include sugar esters, dextrins, and other starch hydrolysis products. However, the humectant sugars are preferred because of their sweetness.

The humectant may be included in the dough as an added ingredient, or an enzyme may be included in the dough formulation which acts on a substrate also included in the dough during, before or after baking, to produce effective amounts of the humectant in situ in the dough. Examples of suitable enzymes for the purpose include invertase which effects the inversion of sucrose to invert sugar, as well as other glycosidases and polysaccharidases which after acting on carbohydrates present in the dough produce humectants as the by-products of their enzymatic activity.

Enzymes suitable for use in this manner include polysaccharidases which act upon farinaceous materials to produce lower molecular weight saccharides such as glucose, maltose, modified starches, dextrins, etc. Enzymes of this type include alpha- and beta- amylases. Alpha-amylases, such as those obtained from bacterial sources (*Bacillus subtilis* or *B. mesintericus*) are known to be heat-stable, and have been reported to be able to retain some activity at temperatures as high as 100° C. The number of SKB units of amylase enzyme per 100 grams of flour will typically be about 6 to 1000 units. Pregelatinized starch may be added to the dough to produce a readily available substrate for the enzyme. SKB units may be assayed by the method of Sandstetde, Kneen and Blish, described in Cereal Chemistry, 16, 712 (1939). Amylase enzymes are commercially available, and include Fresh-N, a product of G. B. Fermentation Industries Inc, Charlotte, North Carolina as well as Termanyl and Bacterial Amylase Novo (Ban) which are products of Novo Industry A/S, Novo Alle, DK-2880, Bagsvaerd, Denmark.

Edible humectant gels such as a humectant sucrose gel and/or a high fructose corn syrup gel can be used in the cookie dough for achieving a soft and chewy texture which is stable for prolonged periods. Preparation of the gels and of doughs containing them for producing soft edible baked products having extended shelf life is taught in U.S. Pat. No. 4,444,799 and commonly assigned pending U.S. application Ser. No. 712,206, filed Mar. 15, 1985 now U.S. Pat. No. 4,624,856, which is a continuation of U.S. application Ser. No. 580,365, filed Feb. 16, 1984, now abandoned, which in turn is a continuation-in-part of the application which issued as U.S. Pat. No. 4,444,799. U.S. Pat. No. 4,444,799 is herein incorporated herein by reference in its entirety.

In accordance with the teachings of U.S. application Ser. No. 712,206 now U.S. Pat. No. 4,624,856, a firm gel, capable of being ground is obtained by admixing: a) from about 0.25 parts by weight to about 4.0 parts by weight, preferably from about 0.5 parts by weight to about 1.5 parts by weight of an edible gum capable of being set by calcium ions, and b) from about 0.1 parts by weight to about 4 parts by weight, preferably from about 0.25 parts by weight to about 1.0 parts by weight of a calcium ion source, said parts being based upon 100 parts by weight of the edible viscous liquid. The ingredients are admixed under high shear mixing conditions which assures an at least substantially lump-free and homogeneous gel.

The edible firm, elastic or rubbery gel is ground into pieces typically at temperatures of from about 65° F. to about 85° F. The ground gel is incorporated into a dough using conventional mixing techniques known in the bakery art. The ground gel which is incorporated into the dough is not discernible as pieces in the baked good upon consumption. The amount of water used to produce the gels generally ranges from about 15% by weight to about 35% by weight, based upon the total weight of the gel.

A humectant gel for use in the present invention can be prepared by using sucrose syrup and/or high fructose corn syrup as the edible viscous liquid, sodium alginate as the edible gum, and food grade calcium sulfate dihydrate as the calcium ion source. Other gums which may be employed include potassium alginate, ammonium alginate, carrageenan, guar gum, locust bean gum, starch, protein, Xanthan gum, mixtures thereof, and the like. Other calcium ion sources which may be employed include food grade monocalcium phosphate anhydrous, calcium sulfate, calcium carbonate, calcium lactate, calcium monohydrogen phosphate, dicalcium orthophosphate dihydrate, tricalcium phosphate, calcium chloride, mixtures thereof, and the like. Weight ratios of sodium alginate/edible calcium ion source in the range of about 1 to 3 are generally used.

Propylene glycol and glycerine may be used as dispersing agents for the calcium source or the sodium alginate.

In the dough bakeable to a cake-like moist, soft textured crumb structure, on the basis of 100 pounds of the flour component of the dough, the humectant plus any sucrose or other sweetener employed (e.g. artificial sweeteners) in the formulation may be present in amounts ranging from about 25 to about 150 pounds depending on the degree of sweetness and humectant properties desired in the baked product. Typical amounts of high fructose corn syrup for use in the present invention range from about 10% by weight to about 50% by weight, based upon the weight of the flour. It may be in liquid form and/or in a humectant gel. Typical amounts of sucrose for use herein range from about 35% to about 60% by weight, based upon the weight of the flour.

Typically, the total sugar solids content (exclusive of inclusions) of the dough is from about 50 to about 110 pounds of sugar per 100 pounds of the flour component.

The flour employed in the cookie doughs is selected from conventional ingredient lines. The flour component may be any comminuted cereal grain or edible seed meal such as wheat flour, corn flour, corn starch, modified starch, rice flour, potato flour, barley flour, or the like. Wheat flour is preferred, and may be bleached or unbleached. Bleached flour tends to produce less oven spread during baking.

The dough may contain up to about 5 percent by weight, typically from about 1% to about 3% by weight of a leavening system, based upon the weight of the flour. a suitable leavening system comprises sodium bicarbonate, calcium phosphate, monobasic, and ammonium bicarbonate.

The initial moisture content of the dough is adjusted to provide the desired consistency to the dough to enable proper mixing, working and shaping. The total moisture content of the dough will include any water included as a separately added ingredient, as well as the moisture provided by flour (which usually contains about 12% to about 14% by weight moisture), and the moisture content of other dough additives which may be included in the formulation, such as the humectant gel, high fructose corn syrup, invert syrups, or other liquid humectants. Taking into account all sources of moisture in the dough, including separately added water, the total initial moisture content of the dough is generally less than about 20% by weight of the dough formulation, exclusive of particulate inclusions such as nuts, raisins, chocolate chips, and the like. As moisture contents approach about 18-20% by weight, the dough compositions may tend to stick excessively to processing equipment such as conveyors, dough cutters, and the like. Moisture contents of from about 12% by weight to about 16% by weight, based upon the weight of the dough are typically used.

In addition to the foregoing, the cookie doughs used in the process of the invention may include other additives conventionally employed in cookies. Such additives may include, for example, chocolate liquor, salt, milk by-products, egg or egg by-products, vanilla, pregelatinized starch, such as pregelatinized corn, wheat, and waxy maize starch, peanut butter, cereal (oatmeal) as well as inclusions such as nuts, raisins, and coconut. Minor amounts of an emulsifier may also be used. Typical emulsifiers which can be used include sorbitan monostearate, mono- and/or di-glycerides, polyoxyethylene sorbitan fatty acid esters, such as polysorbates (e.g., polyoxyethylene (20) sorbitan monostearate), and sodium stearoyl-2-lactate.

The cookie doughs of the present invention can be prepared in a conventional manner using a creaming stage and a dough-forming stage. The sucrose, shortening or fat for preventing bloom, humectant, and flavoring ingredient for reducing mobility of the shortening or fat in the cookie are creamed together. This is followed by addition of water, leavening agent, and flour with mixing to form a dough. If a humectant gel is used, it is preferably preground and then mixed in during the creaming stage.

The flavor chips are added as the last ingredient to the dough with minimal mixing so as to avoid smearing of the flavor chips into the dough. The dough is suitably cooled to about 60° to about 65° F. (about 15.6° to about 18.3° C.) using carbon dioxide snow to facilitate its transfer to or through a suitable dough forming device. The dough is suitably cut into pieces using conventional wire-cutting machines.

The time and temperature of baking are adjusted in accordance with conventional techniques to provide a moisture content in the baked cookie of 6 percent or more, based upon the weight of the cookie, inclusive of inclusions such as flavor chips. A typical cookie produced in accordance with the present invention has a moisture content (Brabender 145° C., 12 minutes) of from about 7.8% to about 8.8% by weight, based upon the total weight of the cookie, which includes chocolate chips. Moisture contents are determined by first grinding the cookies and then using conventional moisture analysis techniques on the ground sample. Exemplary of such techniques are Brabender (set at 145° C., for 12 minutes) analysis or vacuum oven (set at 70° C. for 24 hours) analysis, with appropriate correlation. The pH of the cookie suitably ranges from about 6.3 to about 7.0. The pH may be determined by grinding a sample of cookies and measuring the pH of a 10% by weight slurry in distilled water.

The water activity of the baked cookie should be less than about 0.7, preferably less than or equal to about 0.65, to assure microbial shelf stability. While baking times and temperatures will vary for different dough formulations, oven types, etc., in general commercial cookie baking times may range from about 5 minutes to about 15 minutes and baking temperatures for cookies may range from about 250° F. (121° C.) to about 500° F. (260° C.).

The method of the present invention is particularly suited for the prevention of bloom in moist, soft drop-type cookies, such as fudge chocolate chip cookies, peanut butter fudge chocolate chip cookies, fudge chocolate chip raisin cookies, and the like.

Fat bloom problems also may be guarded against in extended shelf-life cake-like moist, soft textured cookies such as peanut butter, chocolate chip cookies, oatmeal chocolate chip cookies, chocolate chip cookies, and peanut butter chocolate/peanut butter chip cookies by replacement of higher melting shortening or fats with a shortening or fat which is essentially completely liquid at a temperature of about 100° F. or less and has a solid fat index of less than about 13, at 80° F., e.g. from about 18 to about 25 at 50° F., and from about 7 to about 11 at 80° F. A typical higher melting shortening or fat used in the mass production of wire-cut cookies is plasticized and is a partially hydrogenated soybean and cotton seed oil blend having a solid fat index of about 25–30 at 50° F., 17–22 at 70° F., 15–20 at 80° F., 11–14 at 92° F. and 6–9 at 104° F.

The present invention is further illustrated in the following examples where all parts, ratios, and percentages are by weight and all temperatures are in ° F, unless otherwise stated.

EXAMPLE 1

The ingredients and their relative amounts used to prepare a bloom resistant fudge chocolate chip cookie with a moist, cake-like soft textured crumb structure in accordance with the present invention were:

| Ingredient | Parts By Weight |
|---|---|
| Flour | 100 |
| Sucrose | 46 |
| Soybean Oil* | 50 |
| High Fructose Corn Syrup (about 72% solids, 42% fructose, 50% dextrose) | 25 |
| Corn Syrup (64 DE/83 BE) | 5 |
| Honey | 3 |
| Preground High Fructose Corn Syrup based gel of Example I of U.S. Pat. No. 4,444,799 | 18 |
| Red-Black Dutched Cocoa | 12 |
| Chocolate Liquor | 2 |
| Spray Dried Whey | 2 |
| Spray Dried Whole Eggs | 2 |
| Spray Dried Egg Albumen | 2 |
| Salt | 1.5 |
| Sodium Bicarbonate | 0.8 |
| Calcium Phosphate, Monobasic | 0.4 |
| Ammonium Bicarbonate | 0.2 |
| Vanilla Flavor (Liquid) | 0.2 |
| Chocolate Drops (4200 count per lb.) | 45 |
| Water | 13 |

*The soybean oil used was a blend of about equal weights of soybean and palm oil, which had been refined, bleached, partially hydrogenated and deodorized. The spray oil was stabilized with at least about 100 parts per million of TBHQ, and citric acid was added as a chelating agent. The chemical and physical properties of the soybean oil were:

| | | |
|---|---|---|
| % Free Fatty Acid (as Oleic) | 0.05 Max | AOCS Method Ca 5a-40 |
| Initial Peroxide Value (Meq/Kilo) | 1.0 Max | AOCS Method Cd 8-53 |
| Color (Lovibond) | 1.5 Red Max | AOCS Method Cc 13b-45 |
| Wiley Melting Point, °F. | 98–103 | AOCS Method Cc 2-38 |
| A.O.M. Stability (hours) | 100 min. | AOCS Method Cd 12-57 |
| Solid Fat Index | | AOCS Method Cd 10-57 |
| 10° C. (50° F.) | 26.0–31.0 | |
| 21.1° C. (70° F.) | 13.0–18.0 | |
| 26.7° C. (80° F.) | 7.0–11.0 | |
| 33.3° C. (92° F.) | 3.0–7.0 | |
| 37.8° C. (100° F.) | 2.0 Max | |
| Congeal Point, °C. | 25.0–29.0 | AOCS Method Cc Cc 14-59 |

The dough was prepared by creaming the sucrose, together with the soybean oil, preground gel, high fructose corn syrup, honey, corn syrup, cocoa, whey powder, salt, dried eggs, egg albumin, chocolate liquor, and vanilla flavor. Next, the ammonium bicarbonate dissolved in a portion of the water, and the balance of the water were added and mixing was continued. The flour, sodium bicarbonate and calcium phosphate were then added and the mixing continued to form a dough. Finally, the chocolate drops were added and the mixing continued for a further one minute to prepare the finished dough. The dough was formed into pieces using a wire cutter and the pieces were baked to a moisture content of about 8.3% by weight, based upon the weight of the cookie inclusive of the chocolate chips.

EXAMPLE 2

Although not actually made, a fudge chocolate chip cookie in accordance with the present invention may be prepared as in Example 1 with the soybean oil being replaced by one having the same physical and chemical characteristics except it has a Solid Fat Index of 20.0–24.0 at 10° C. (50° F.), 7.0–11.0 at 26.7° C. (80° F.), 3.0–7.0 at 33.3° C. (92° F.) and 0 at 37.8° C. (100° F.).

EXAMPLE 3

The ingredients and their relative amounts used to prepare a bloom resistant moist, cake-like soft or chewy textured fudge chocolate chip raisin cookie in accordance with the present invention were:

| Ingredients | Parts By Weight |
|---|---|
| Flour | 100 |
| Sucrose | 48 |
| Soybean Oil of Example 1 | 50 |
| High Fructose Corn Syrup (about 72% solids, 42% fructose, 50% dextrose) | 25 |
| Corn Syrup (64 DE/43 BE) | 5 |
| Raisins | 17.5 |
| Raisin Paste | 17.5 |
| Preground High Fructose Corn Syrup based gel of Example I of U.S. Pat. No. 4,444,799 | 15 |
| Red-Black Dutched Cocoa | 12 |
| Spray Dried Whey | 8 |
| Salt | 1.3 |
| Sodium Bicarbonate | 1.3 |
| Calcium Phosphate, Monobasic | 0.3 |
| Chocolate Drops (4200 count per lb.) | 45 |
| Water | 8.25 |

The dough was prepared by creaming the sucrose, together with the soybean oil, preground gel, high fructose corn syrup, cocoa, whey powder, salt and raisin paste. Next, the raisins and the water were added and mixing was continued. The flour, sodium bicarbonate and calcium phosphate were then added and the mixing continued to form a dough. Finally, the chocolate drops were added and the mixing continued for a further one minute to prepare the finished dough. The dough was formed into pieces using a wire cutter and the pieces were baked to a moisture content of about 8% by weight, based upon the weight of the cookie inclusive of the chocolate chips.

What is claimed is:

1. A method for preventing bloom and oil seepage in cookies having a moist cake-like soft texture throughout the cookie which lasts for at least about two months in a closed container comprising:
   a) forming a cookie dough with both a shortening or fat having a solid fat index of from about 18 to 31 at 50° F.(10° C.), 13.0 –18.0 at 70° F.(21.1° C.), less than 13 at 80° F.(26.7° C.) and being essentially completely liquid at a temperature of about 100° F. (37.8° C.) and a flavoring ingredient for reducing mobility of said shortening or fat in the cookie, said cookie dough comprising flour, sugar, flavor chips which are susceptible to bloom and a humectant in an amount of from about 10% by weight to about 50% by weight, based upon the weight of the flour, the amount of said shortening or fat being from about 20% by weight to about 80% by weight, based upon the weight of the flour, and the amount of said flavoring ingredient being from about 10% by weight to about 45% by weight, based upon the weight of the shortening or fat, and
   b) baking said cookie to obtain said moist cake-like soft texture throughout the cookie, wherein interaction between said flavoring ingredient and said shortening or fat controls excessive oven spread and prevents undesirable oil seepage from the cookie to packaging materials.

2. A method as claimed in claim 1 wherein said flavoring ingredient is cocoa and/or carob powder.

3. A method as claimed in claim 1 wherein said cookies are baked to a moisture content of from about 7.8% to about 8.8%, based upon the weight of the cookies.

4. A method as claimed in claim 3 wherein the pH of the cookies is from about 6.3 to about 7.0.

5. A method as claimed in claim 1 wherein the flavoring ingredient is lipophilic so as to reduce mobility of the shortening or fat instead of water in the cookie.

6. A method as claimed in claim 3 wherein the flavoring ingredient is a cocoa.

7. A method as claimed in claim 6 wherein the cocoa is ia Dutched cocoa.

8. A method as claimed in claim 1 wherein the dough is formed into pieces by wire-cutting.

9. A method as claimed in claim 8 wherein the humectant comprises a firm edible high-fructose corn syrup-based gel and high fructose corn syrup.

10. A method as claimed in claim 1 wherein the sugar, shortening or fat, humectant, and flavoring ingredient are creamed together, water is added to the creamed mixture and mixing is continued, and then the flour is added.

11. A method as claimed in claim 10 wherein flavor chips are added after mixing in the flour.

12. A method as claimed in claim 1 wherein flavor chips comprising sugar and fat are mixed into the dough.

13. A method as claimed in claim 1 wherein the shortening or fat ranges from about 35% by weight to about 65% by weight, based upon the weight of the flour.

14. A chocolate fudge cookie obtained by the method of claim 12 wherein said flavoring ingredient is a cocoa.

15. A method as claimed in claim 1 wherein the said shortening or fat has a solid fat index of from about 18 to about 25 at 50° F., a solid fat index of from about 7 to about 11 at 80° F., and is essentially completely liquid at a temperature of about 100° F.

16. A method as claimed in claim 1 wherein the shortening or fat is a blend of refined partially hydrogenated soybean oil and palm oil and has a solid fat index of about 26.0–31.0 at 50° F. (10° C.), 13.0–18.0 at 70° F. (21.1° C.), 7–11 at 80° F. (26.7° C.), 3.0–7.0 at 92° F. (33.3° C.) and a maximum of 2.0 at 100° F. (37.8° C.).

17. A method as claimed in claim 15 wherein the the flavoring ingredient is a cocoa and the flavor chips comprise chocolate chips.

18. A method as claimed in claim 16 wherein the the flavoring ingredient is a cocoa and the flavor chips comprise chocolate chips.

19. A method as claimed in claim 6 wherein said cocoa is a red-black Dutched cocoa, and said shortening or fat is a blend of refined partially hydrogenated soybean oil and palm oil and has a solid fat index of about 26.0–31.0 at 50° F. (10° C.), 13.0–18.0 at 70° F. (21 1° C.) 7–11 at 80° F. (26.7° C.) 3.0–7.0 at 92° F. (33.3° C.) and a maximum of 2.0 at 100° F. (37.8° C.).

* * * * *